Aug. 30, 1927.

H. H. HUMPHREY 1,640,571

FUEL ECONOMIZER FOR INTERNAL COMBUSTION ENGINES

Filed May 3, 1926

INVENTOR.
Henry H. Humphrey.
BY Harry L. Beimes
ATTORNEY.

Patented Aug. 30, 1927.

1,640,571

UNITED STATES PATENT OFFICE.

HENRY H. HUMPHREY, OF ST. LOUIS, MISSOURI.

FUEL ECONOMIZER FOR INTERNAL-COMBUSTION ENGINES.

Application filed May 3, 1926. Serial No. 106,396.

My invention has relation to improvements in accessories for internal combustion engines and is directed more particularly to fuel saving devices as an adjunct to the carburetor in supplying the motivating medium to the cylinders.

Briefly, the invention consists in a receptacle for water or other suitable fluid connected by a tube to the air intake of the carburetor, said tube being intimately associated with the engine exhaust manifold so that as the water enters the tube, it will be converted into vapor which is sucked into the intake manifold together with the air supply to support combustion.

The principal object of the invention is to mingle with the fuel mixture a combination of water vapor, which water vapor on entering into the engine cylinders will expand under the influence of the heat caused by the explosion of the fuel mixture therein and augment the expansive effect of the fuel mixture to impart energy to the pistons. Obviously, part of the work that is performed on the pistons by the combustion of the fuel mixture will be performed by the expanding of the water vapor converted into superheated steam by the combustion of the fuel mixture thereby requiring a lesser amount of fuel and greatly increasing the efficiency of the engine. In addition to the economy effected in the use of fuel, I have found by experiments that the operation of the engine is greatly improved, the engine passing through its cycle of operations in a smoother manner. These advantages as well as others adherent in the invention will be better apparent from a detailed description thereof in connection with the accompanying drawings, in which—

Figure 1:
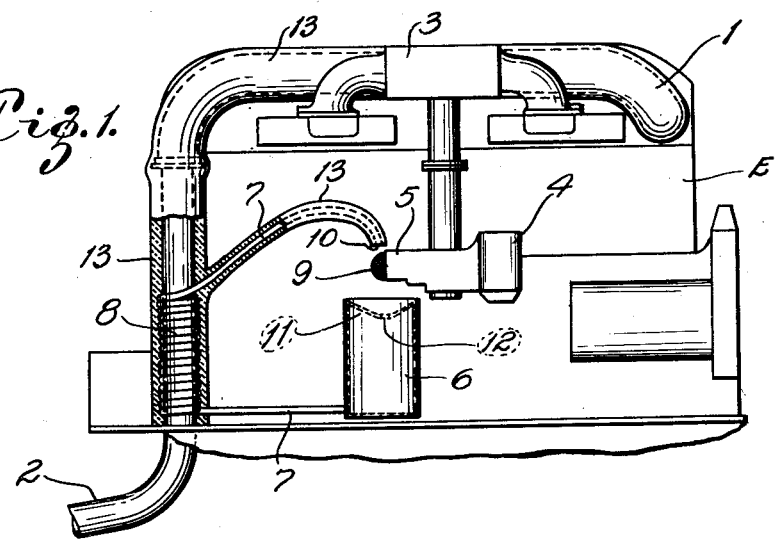
Figure 2:
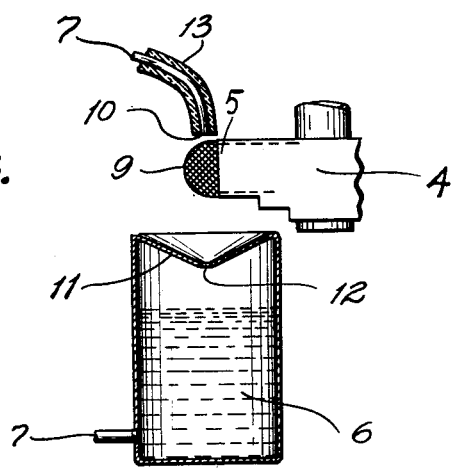

Fig. 1 is a side elevation of a conventional automobile engine showing my invention applied thereto; Fig. 2 is an enlarged detail showing the water receptacle, carburetor air intake and vapor discharge end of the tubing; and Fig. 3 is a view showing a modification of the invention in which a water jacket is formed around the exhaust pipe for converting the water into vapor.

Referring to the drawings, E represents a conventional automobile engine provided with the usual exhaust manifold 1, to which is connected an exhaust pipe 2 and fuel intake manifold 3 to which is connected a carburetor 4 having an air intake 5 through which the air for supporting the combustion of the fuel enters.

My invention consists in a device for supplying a suitable vapor (preferably water vapor) to the air intake 5 of the carburetor, the apparatus whereby this is accomplished comprising a water receptacle 6 disposed subjacent to the carburetor intake 5, from the lower part of which receptacle leads a tube 7 to the exhaust pipe 2 about which this tube is coiled as shown at 8, before being led to a point in close proximity with the said carburetor intake 5. A strainer 9 is placed over the mouth of the intake 5 so that the discharge from the outlet 10 of the tube 7 will pass through said strainer before entering the carburetor intake 5. The object of thus arranging the discharge 10 of the tube 7 above the strainer 9 is to cause any globules of moisture that may be carried through the tube with the vapor to fall upon said strainer and thereby be broken into smaller particles and vaporized before entering the carburetor intake 5. Should any moisture escape vaporization, it will be dropped through the strainer 9 into the receptacle 6 which is provided with a funnel-shaped top wall 11 and a central opening 12 through which the moisture again enters the receptacle 6. In order to maintain the heat around the coil 8 and around that part of the pipe 7 leading from the coil to the carburetor intake 5, I provide a covering 13 of a suitable heat insulating material such as asbestos over the exhaust manifold 1 and that part of the exhaust pipe on which the coil 8 is wrapped and over that part of the pipe 7 leading from the coil to the intake 5. It will be apparent from the foregoing that during the operation of the engine, the water standing in the coil 8 will be vaporized by the heat of the exhaust pipe 2, said vapor passing over through the upper part of the pipe 7 to the air intake 5 of the manifold and will be sucked into the carburetor together with the air of the fuel mixture, and the engine cylinders will be supplied with a fuel mixture that is saturated or partly saturated with water vapor or steam. As this water vapor enters the highly heated cylinders and is subjected to the heat of the combustion of the fuel therein, it will be very greatly superheated and, consequently, will expand to a very high degree, which expansion assists the expansion of the gaseous products due to the fuel combustion and greatly increases the work performed on the pistons for a given amount of fuel combustion. In other words, the expansion of the water vapor into superheated steam augments and supplements the expansion of the burning fuel gases, thereby reducing the amount of fuel gases required.

Figure 3:
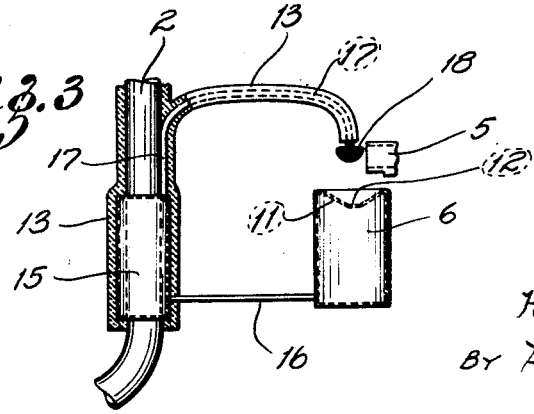

In Fig. 3 I show a modification of the invention, the coil 8 being replaced by a water jacket 15 around the exhaust pipe 2, said water jacket being connected to the receptacle 6 by a feed pipe 16 and the vapor generated within said water jacket being conducted to the carburetor intake 5 by a pipe 17. In lieu of the strainer disposed over the mouth of the carburetor intake 5, I provide a spray head 18 on the discharge end of the pipe 17. It will be observed that the operation of the vaporizing device is automatic so long as water is maintained in the receptacles and the amount of vapor supplied in the engine is approximately proportional to the amount of fuel supplied thereto inasmuch as this vapor is supplied through the air intake of the carburetor. However, if it is desired, the water receptacle 6 could be placed at any convenient point on the engine or in the automobile itself, and some well known type of feeding device could be used to control the supply of water that is vaporized. It is also within the scope of the invention to close the receptacle 6 against atmospheric pressure and operate the system under a desired pressure in which event a safety or a release valve, set at a few ounces of pressure, would be placed at the top of the receptacle.

Water is preferably used to supplement the fuel for the purposes explained because it is the cheapest liquid obtainable that will vaporize and expand under increases in temperature, although other volatile liquids could be used for the same purpose. For instance alcohol can be used in the water tank mixed with the water therein to prevent the water from freezing in winter and no bad effect would result in the engine. In fact the combustion of the alcohol may possibly result in increased efficiency.

Having described my invention, I claim:

In a device of the character described for internal combustion engines having intake and exhaust manifolds, a carburetor for admitting fuel to said intake manifold, a container for water subjacent the carburetor, a conduit leading from said container to a point adjacent the air inlet of the carburetor and having its outlet above the container, means for vaporizing the water passing from the container to the outlet of the conduit, said vapor being sucked into the carburetor by the action of the engine to augment the fuel action, and means for breaking up any unvaporized globules discharging from the conduit outlet.

In testimony whereof I hereunto affix my signature.

HENRY H. HUMPHREY.